INVENTOR.
NORMAN E. PEDERSEN
BY Charles M. Hogan
Melvin E. Frederick

INVENTOR.
NORMAN E. PEDERSEN
BY Charles M. Hogan
Melvin E. Frederick

United States Patent Office 3,566,408
Patented Feb. 23, 1971

3,566,408
METHOD OF AND APPARATUS FOR THREE COLOR-ECHO RANGING

Norman E. Pedersen, Wilmington, Mass., assignor to Avco Corporation, Cincinnati, Ohio, a corporation of Delaware
Filed Feb. 26, 1969, Ser. No. 802,363
Int. Cl. G01s 9/02, 7/28
U.S. Cl. 343—17.1                                9 Claims

ABSTRACT OF THE DISCLOSURE

A method of an apparatus utilizing three-color echo ranging wherein the received signal from each of three successive radar or higher frequency transmission pulses at slightly different frequencies is coupled to a different electron gun of a three-color cathode ray tube. The cathode ray tube is accordingly successively swept, for example, in red at $f_0$, in blue at $f_0+\Delta f$, and in green at $f_0+2\Delta f$, thereby providing a display showing three sets of spatially uncorrelated clutter returns as red, blue, and green dots which are dimensionally separated from each other on the face of the cathode ray tube. A target, however, as distinguished from clutter produces a white dot which is the combination of red, blue and green. Signal storage means may be included where the cathode ray tube phosphors have a short decay time compared to the sector scan time of the echo ranging system.

---

This invention relates to an improved echo ranging system and particularly to one providing improved discrimination between correlated clutter and targets of interest.

An object of this invention is to increase target echo to correlated clutter discrimination in an electromagnetic echo ranging system.

Another object of the invention is to provide an electromagnetic echo ranging system which provides improved discrimination against correlated clutter in real time.

A further object of the invention is to provide a method of and electromagnetic echo ranging apparatus that provides improved target recognition in a correlated clutter environment.

A still further object of the invention is to provide a method of and means for presenting electromagnetic target reflected signals in a color different from that of background-reflected signals.

Figure 1:
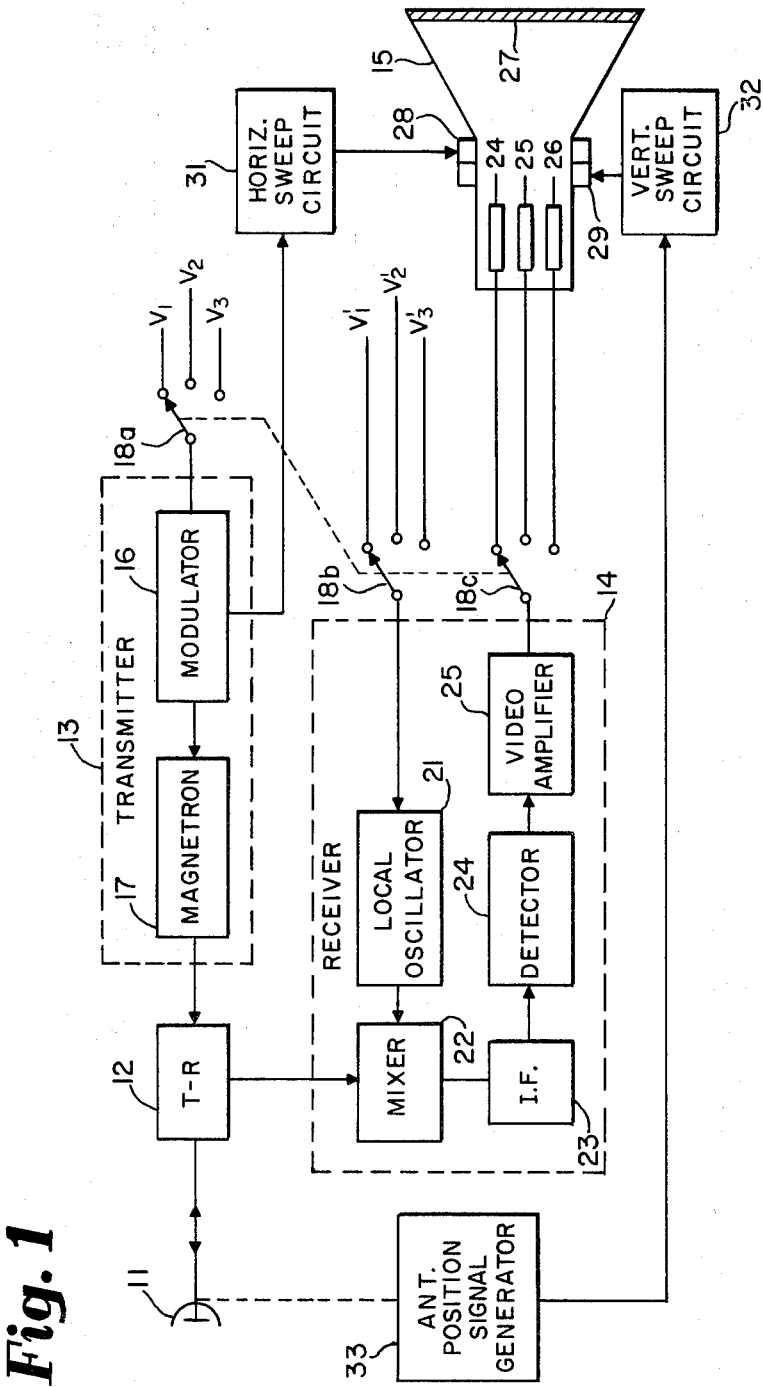
Figure 2:
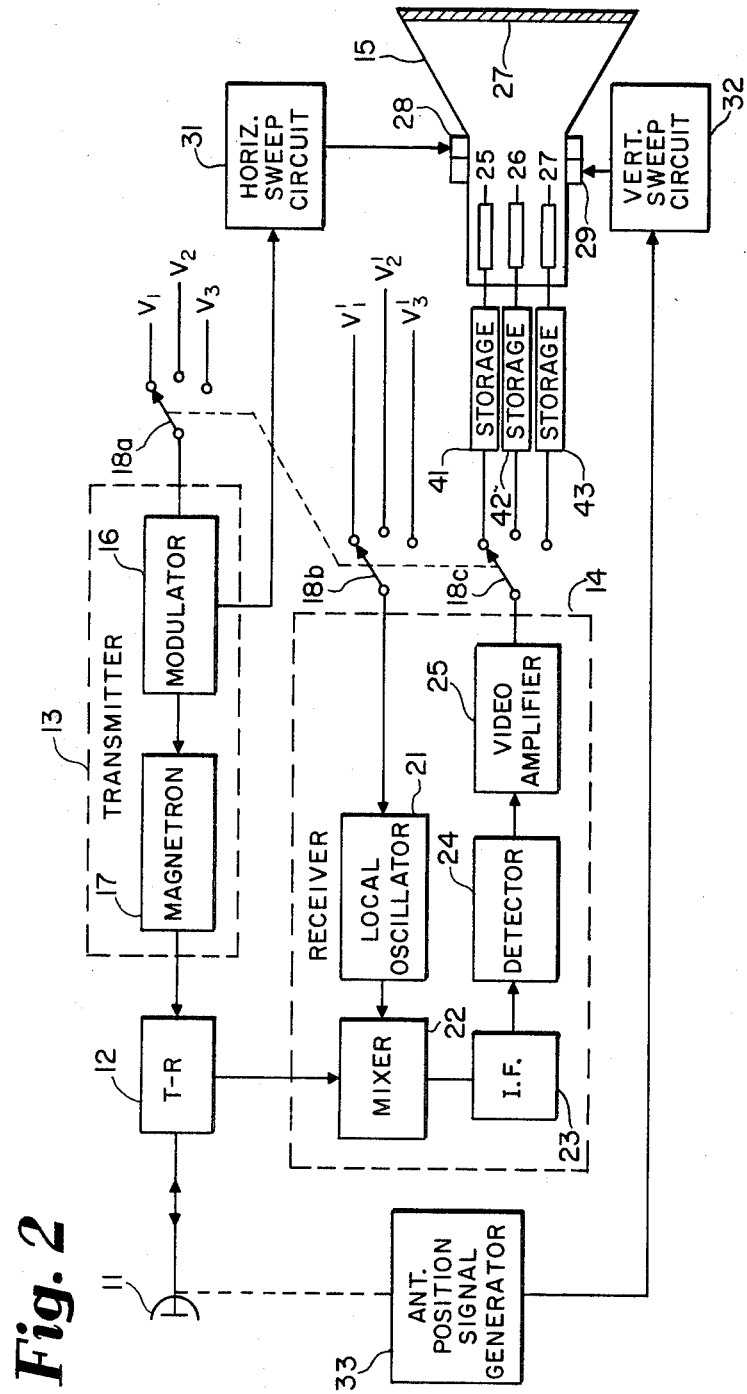

The novel features that are considered characteristic of the invention are set forth in the appended claims; the invention itself, however, both as to its organization and method of operation, together with additional objects and advantages thereof, will best be understood from the following description of a specific embodiment, when read in conjunction with the accompanying drawings, in which:

FIG. 1 is a schematic representation of a simplified embodiment of the invention; and FIG. 2 is a schematic representation of an alternate embodiment of the invention.

By way of background to this invention, it may be noted that broadly echo ranging systems function by virtue of the reflection of energy (acoustic or electromagnetic) from some object. In echo ranging, the target observed is caused to act as a secondary source of energy. It is thus possible by means of echo signal transmission to detect the approach or the presence of an otherwise silent or invisible target. By measuring the duration of the signal travel time and determining the target bearing, it is also possible, from a single observation point, fully to establish the position of a reflecting target. The basic operations involved in echo ranging are the transmission of wave energy and the subsequent reception of such portions of the energy as may be directed to an observation point by reflection. The outgoing signal is generally known as the pulse and the return signal, after reflection by some given target, is the echo signal. Energy return by reflectors other than that which it is desired to observe is generally known as the clutter signal. The relation between echo and clutter is, in some respects, similar to the signal-to-noise ratio and is often the factor which limits the performance of an echo-ranging system.

In echo ranging, it is often difficult to find any significant difference between correlated echo and correlated clutter signals. The correlated echo signal, in fact, is merely a component of correlated clutter signals to which special interest is attached. Thus, it is frequently difficult in radar systems and the like for the operator to discern targets sharply and adequately. This is especially true when the target is situated upon and surrounded by landmass. The reflections from landmass (terrain clutter), though ordinarily not as strong as the reflections from buildings and other targets, nevertheless tend to prevent and frequently do prevent sharp definition of the target by illuminating the cathode ray indicator in the vicinity of the target, thus reducing the visual contrast. This difficulty is not ordinarily experienced where the target is a ship surrounded by calm water since only a very small portion of the transmitted energy is reflected from a smooth water surface back to the radar receiver. But a choppy sea does reflect strongly from the inclined surface of the waves back to the radar receiver (sea clutter) and the visual contrast between a ship and such a sea on conventional radar indicators may be as unsatisfactory as between a building and landmass surrounding the building. Accordingly, considerable effort has been directed to the development of methods and/or apparatus for recognizing radar targets in the presence of correlated clutter background.

As distinguished from three color echo ranging display sonar systems such as disclosed in U.S. Pat No. 3,307,142, which purportedly provide improved target echo to uncorrelated reverberation discrimination, the present invention utilizes the fact that correlated radar clutter such as, for example, sea and terrain clutter, can in many cases be effectively decorrelated by means of frequency agility. In general, the amount by which the transmitted pulse is sequentially shifted in frequency is a very small fraction of the operating frequency. The condition $\Delta f = 1\tau_p$ usually suffices, where $\Delta f$ is the required frequency shift and $\tau_p$ is the pulse width. Thus, for an X-band radar operating at $f_0 = 10,000$ mHz. with $\tau_p = 0.1$ microsecond, the fractional frequency increment is $\Delta f/f_0 = (\tau_p f_0)^{-1} = 10^{-3}$. Such a radar typically may have a repetition rate of several thousand pulses per second.

The aforementioned sequential frequency shifting is effective in decorrelating sea and terrain clutter, for example, when a multiplicity of scatterers collectively contribute to the overall return from each resolution cell under observation. There may be from tens of thousands to millions of resolution cells in a typical PPI or B-scope presentation. These "false returns" or clutter vary from one resolution cell to the next, and also scintillate with a time constant on the order of one second or less. Thus, a slight change in frequency from $f_0$ to $f_0+\Delta f$ is sufficient to give rise to a clutter presentation which is essentially uncorrelated with that obtained at $f_0$. The reason for this is that the detailed phase differences between the returns from the individual scatterers within any given resolution cell have been altered sufficiently so as to decorrelate (randomize) the overall phase addition of the returns from the scatterers within that cell.

If a radar target is present in one of the resolution cells under observation, and if the return from this target constitutes the main return from this resolution cell, a slight shift in frequency as noted above will not in general give rise to a substantial change in the return from that cell. The reason for this is that the radar target is quite small in dimension as compared to the dimension of the resolution cell. Therefore, a small fractional change in frequency, for example, .001 as noted above will not substantially alter the detailed phase relationship in the return from the target even if the target is a complex scatterer.

Considering now the overall target-clutter background situation described above, it will now be clear that if a radar system is sequentially pulsed at a high rate at a first frequency $f_0$, a second frequency $f_0+\Delta f$, a third frequency at $f_0+2\Delta f$, the first frequency $f_0$, the second frequency $f_0+\Delta f$ . . . etc., there will be three spatially uncorrelated sets of large clutter returns and one spatially correlated (overlapping) set of target returns appearing on a PPI presentation.

Directing attention now to FIG. 1, there is illustrated in block diagram a novel echo ranging system comprising the major components of a radar echo ranging system combined to function in accordance with the invention. Referring now to the details of FIG. 1, there is shown a system having a T–R switch 12 for coupling the transmitter signals to and received signals from an antenna 11. A transmitter 13 is coupled to T–R switch 12 as is a receiver 14, and a cathode ray color tube 15 is coupled to the output of the receiver 14. The transmitter 13 is comprised of a modulator 16 and a magnetron 17. The input of modulator 16 is coupled via one portion 18a of suitable switching means to voltages $V_1$, $V_2$, and $V_3$ required to cause the necessary slight frequency shifts. Modulator 16 actuates magnetron 17 which may be of the voltage tunable type, the output of magnetron 17 being coupled to T–R switch 12. The receiver 14 is comprised of a local oscillator 21, mixer 22, IF stage 23, detector 24, and video amplifier 25. The local oscillator 21 is coupled via portion 18b of the switch to voltages $V_1^1$, $V_2^1$, and $V_3^1$ required to tune the local oscillator to the proper frequency. The output of local oscillator 21 together with the return signals from T–R switch 12 are supplied to the mixer 22 and thereafter passed through the IF stage 23, detector 24 and video amplifier 25 in conventional manner. The output signal from video amplifier 25 is coupled via portion 18c of the suitable switching means, such as, for example, an electronic switch, to the appropriate electron gun in the cathode ray tube 15. The cathode ray tube 15 is provided with three electron guns 24, 25, and 26, suitable phosphors 27 on the face of the cathode ray tube, and a deflection yoke including a horizontal deflection coil 28 and a vertical deflection coil 29. The horizontal sweep circuit 31 is triggered by modulator 16 in the transmitter and its output is coupled to the horizontal deflection coil 28. The vertical sweep circuit 32 is actuated in conventional manner by an antenna position signal generator 33 mechanically coupled to the antenna 11. The output of the vertical sweep circuit is coupled to the vertical deflection coil 29 in conventional manner.

Programming means generally illustrated by switches 18a, 18b and 18c are coupled to the transmitter 13 for initiating each pulse output of the transmitter, coupled to the input of the local oscillator 21 in the receiver 14 and coupled to the output of the receiver and the electron guns of the color tube for coupling the receiver output selectively to one of the electron guns. At the appropriate time after each transmission pulse, the programming means decouples the receiver from the electron gun it was last coupled to and coincidentally with triggering of the deflection circuit (via modulator 16 for example) the programming means couples the receiver output to another of the electron guns. Suitable and conventional switching apparatus as required by the pulse repetition rate may be used as the programming means.

The electron guns may be biased to cutoff and signals from the receiver utilized to overcome the cutoff bias. Along the trace path, a target will register as a white spot by addition of the primary colors red, green, and blue while clutter or random uncorrelated noise registers in one of the aforementioned primary colors. On the other hand, partial correlation of the clutter which may result from overlapping of two colors will produce a color other than white (for example, violet, blue-green or yellow) while partial decorrelation of the signal will produce a pale color—not white, but certainly not red, blue or green either.

The present invention provides a great improvement over simple signal integration although it does indirectly provide such integration. Greatly enhanced target detection is provided because the operator's sense of color perception is introduced directly into the data processing link, and provides the target/clutter discrimination apparatus. Thus the invention provides via the sense of color perception and via the brain of the operator a highly effective means of discriminating between the uncorrelated or only partially correlated clutter signals and the correlated target signals. Thus the present invention at least in part relies on the fact that the brain of the operator will constantly supply the correlation formation as compared with that which would have to be supplied by a computer program. The brain of an experienced operator is deemed to be better at this than a computer since the brain can constantly adjust to varying conditions such as sea state, type of target, etc. In addition, utilization of the brain of the operator eliminates the need for a computer which would be a rather elaborate and expensive item and which would take up valuable space in an aircraft, for example.

Further, since the repetition rates of most radars are between several hundred and several thousand pulses per second, radar apparatus and the like in accordance with the present invention will not only operate in real time but will provide increased target signal to correlated clutter discrimination as well as increased target signal to random uncorrelated noise discrimination.

Since the sector scan time of most radars is very long compared to the response time of the eye, if phosphors such as those in conventional color TV tubes are used having very short decay times compared with the response time of the eye, the use per se of conventional TV tubes having very short decay times may result in an objectionable visual presentation. However, any means for overcoming this problem should be compatible with the display of data from other sensors, computer read-outs and the like.

The problem noted above may be overcome by either (1) the fabrication of a color tube using long decay time phosphors or (2) the use with conventional color TV tubes of storage apparatus and techniques whereby the data comprising one complete radar scan is collected over a scanning period but is "played back" at a higher rate such as the conventional TV scanning rate of approximately 30 cycles per second.

While the first approach could likely be made to work, a long decay time is disadvantageous from the point of view of multiple uses of the display tube. Further, the possibility of obtaining three mutually compatible phosphors having identical decay curves is remote. On the other hand, the provision of a storage capacity will permit the use of conventional color TV tubes and eliminate the above-noted disadvantages and difficulties associated with long decay time phosphors.

The embodiment shown in FIG. 2 may be employed with color tubes having phosphors with a short decay time such as exist in present day conventional color TV tubes. The embodiment shown in FIG. 2 is identical to that shown in FIG. 1 with the exception that storage means 41, 42 and 43 are provided for respectively electron guns 24, 25, and 26. The storage means may comprise conventional video record/play-back apparatus of either the analog or digital type. Suitable storage means may, for example, comprise a magnetic disk of the order of 10″ in diameter which is divided into a large number of concentric recording rings, at least some of which are capable of storing one complete TV frame. Separate rings may also be used for each primary color and for horizontal and vertical sweep signals for the display tube. Further, additional rings may be used for storing three sets of pulses for the transmitter. Newly arrived video data is read into the magnetic disk on a real time basis and read-out into the color tube in the time taken by the disk to travel from the write head assembly to the read head assembly, i.e., in about 1/30 of a second. Alternately, commercially available radar to TV scan converters can be used to convert the radar information into a standard TV format. These devices use conventional dual beam storage tubes as the storage means.

Apparatus in accordance with the above teaching will provide a continuous display of the latest data gathered by the sensor or antenna with updating of this data occurring in real time (with approximately 1/30 second delay). The provision of a phosphor having a short decay time permits read-out either in color or in black and white of information from other sources. In this manner, there is provided a chromatic signal processing system as described hereinabove, and a data display system with the advantages of (1) optional color, (2) continuous brightness, and (3) permitting the utilization of the disk memory for the purpose of further processing the recorded data and recording result and information (on another band or sets of bands) for real time read-out on the color tube. Further depending on the presence of available excess space on the magnetic disk, additional information, such as, for example, instructions, maps, and the like may be stored for immediate access.

While the present invention has been described in connection with targets in sea clutter, there are many other cases where the present invention is useful. Among these are terrain clutter which is statistically different but is still sufficiently similar to sea clutter that the present invention will find use therein. Further, apparatus in accordance with the present invention is effective as means for discriminating between radar targets and random noise jamming but is not, however, effective against coherent jamming where the incident radar wave is received, amplified, delayed and retransmitted back to the radar.

Since the time between pulses in conventional sonar echo ranging systems is longer than the time required for the decorrelation of sonar clutter, the present invention is not beneficial in such applications. Conversely, prior art sonar techniques for providing improved target echo discrimination is not effective in distinguishing radar targets from correlated radar clutter. This is because the time between consecutive radar pulses is very short compared with the time required for the radar clutter to naturally decorrelate.

In the case of optical (laser) radars, the present invention may be expected to be effective to reduce the effects of atmospheric backscatter by water droplets and dust particles and in conclusion apparatus in accordance with the present invention will discriminate between targets and volume distribution of chaff wherein at least several dipoles are contained in a resolution cell.

It will be understood that various changes in the details, materials and arrangements of parts (and steps) which have been herein described and illustrated in order to explain the nature of the invention may be made by those skilled in the art within the principle and scope of the invention as expressed in the appended claims.

What is claimed is:
1. In electromagnetic echo ranging apparatus, the improvement combination comprising:
 (a) means for transmitting ultra high frequency electromagnetic energy comprising a series of time spaced pulse signals at first, then second and then third slightly different frequencies, said pulse signals being of substantially uniform pulse duration and transmitted at a repetition rate of at least several hundred pulses per second;
 (b) a three gun cathode ray color tube and deflection means for directing the beam from each gun to impinge the tube face, along a selected trace path;
 (c) means coupled to the transmitter and to the deflection means for synchronizing the operation of the deflection means and the transmitter; and
 (d) means coupled to the receiver and to the electron guns to successively display signals returned by each of three successive pulses in different primary colors whereby signals comprising correlated clutter appear uncorrelated on the display in the primary colors and targets appear correlated in white.

2. The combination as defined in claim 1 wherein each of said frequencies are separated by an amount of about $\Delta f$ where $\Delta f$ is substantially the reciprocal of the pulse duration.

3. The combination as defined in claim 2 wherein said tube face is covered with a phosphor having a decay time substantially less than one thirtieth of a second and additionally including recording means for separately recording on a real time basis received echoes at said first, second, and third frequencies and playing back said recorded echoes to said electron guns at a rate of about thirty times per second.

4. The combination as defined in claim 3 wherein said recording means includes a magnetic disk having record head assemblies for separately recording said received echoes and read-out head assemblies for coupling said recorded echoes to said electron guns.

5. The combination as defined in claim 3 wherein said recording means includes dual beam storage tube means for separately recording said received echoes and coupling said recorded echoes to said electron guns.

6. In the method of electromagnetic echo ranging the improvement comprising:
 (a) successively transmitting three time-spaced ultra high frequency electromagnetic pulses each at a slightly different frequency, all of said pulses being of substantially uniform duration and transmitted at a repetition rate of at least several hundred pulses per second;
 (b) receiving echoes returned by each of the successive pulses;
 (c) successively coupling echoes received from pulses at the same frequency to respectively a different electron gun of a three gun cathode ray color tube; and
 (d) recording all of the echoes from said pulses along the same trace path on the screen of said color cathode ray tube whereby echoes returned by a target correlate and are displayed as a white spot and correlated clutter is uncorrelated and displayed in one of the primary colors.

7. The method as defined in claim 6 wherein said pulses are separated in frequency by an amount of about $\Delta f$ where $\Delta f$ is substantially the reciprocal of the pulse duration.

8. The method as defined in claim 7 wherein echoes returned by said pulses at the same frequency are separately recorded and read out for delivery to the said electron guns at a rate of about thirty times per second.

9. The method as defined in claim 8 wherein said echoes at each of said frequencies comprising one complete TV frame are separately recorded on a real time basis and read-out respectively to the electron guns in less than about one-thirtieth of a second.

References Cited

UNITED STATES PATENTS 2,758,298   8/1956   Sunstein _____ 343—5
2,901,747   8/1959   Sunstein _____ 343—17.1X
3,048,837   8/1962   Hart _____ 343—17.1X
3,307,142   2/1967   Doebler _____ 343—17.1X RODNEY D. BENNETT, Primary Examiner T. H. TUBBESING, Assistant Examiner U.S. Cl. X.R.

343—5

PO-1050
(5/69)

UNITED STATES PATENT OFFICE
CERTIFICATE OF CORRECTION

Patent No. 3,566,408      Dated February 23, 1971

Inventor(s) Norman E. Pedersen

It is certified that error appears in the above-identified patent and that said Letters Patent are hereby corrected as shown below:

Column 2, line 50, for "$\Delta f = 1\tau_p$" read -- $\Delta f = 1/\tau_p$ --.

Signed and sealed this 15th day of June 1971.

(SEAL)
Attest:

EDWARD M. FLETCHER, JR.      WILLIAM E. SCHUYLER, JR
Attesting Officer      Commissioner of Patents